March 12, 1963   H. E. CLARY   3,080,718
HYDRAULIC BRAKE SYSTEM
Filed Aug. 1, 1961   2 Sheets-Sheet 1
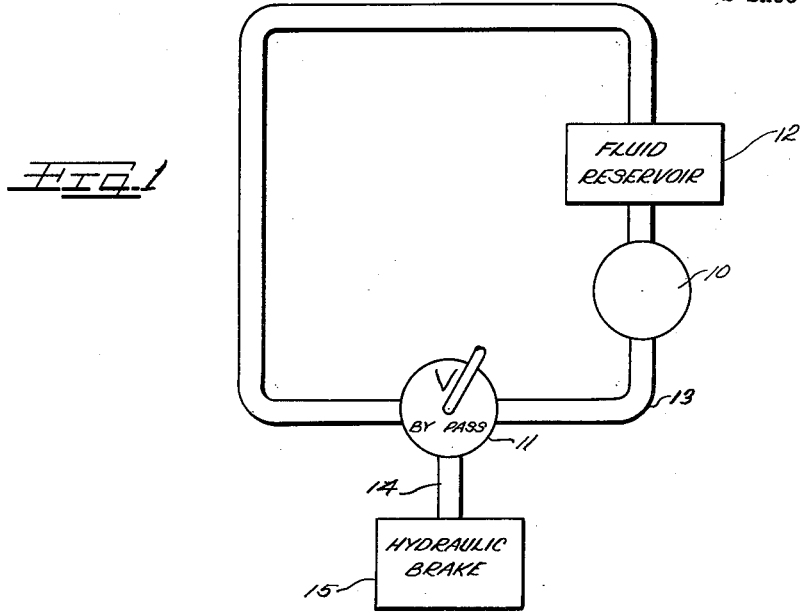
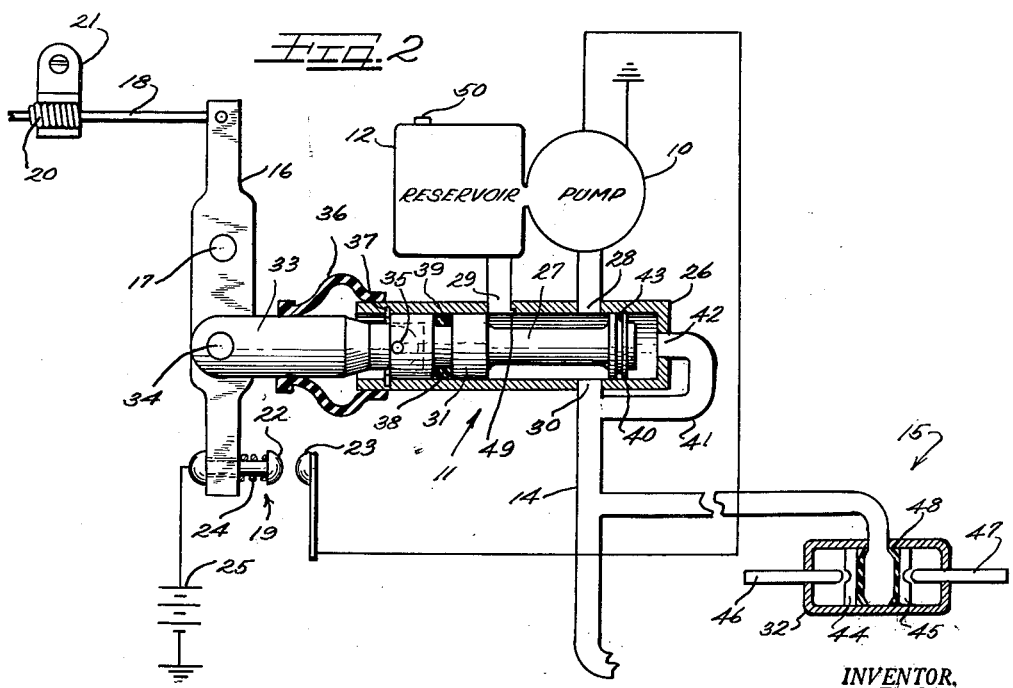
INVENTOR.
Harry E. Clary
BY
Hill, Sherman, Meroni, Gross & Simpson
ATTORNEYS

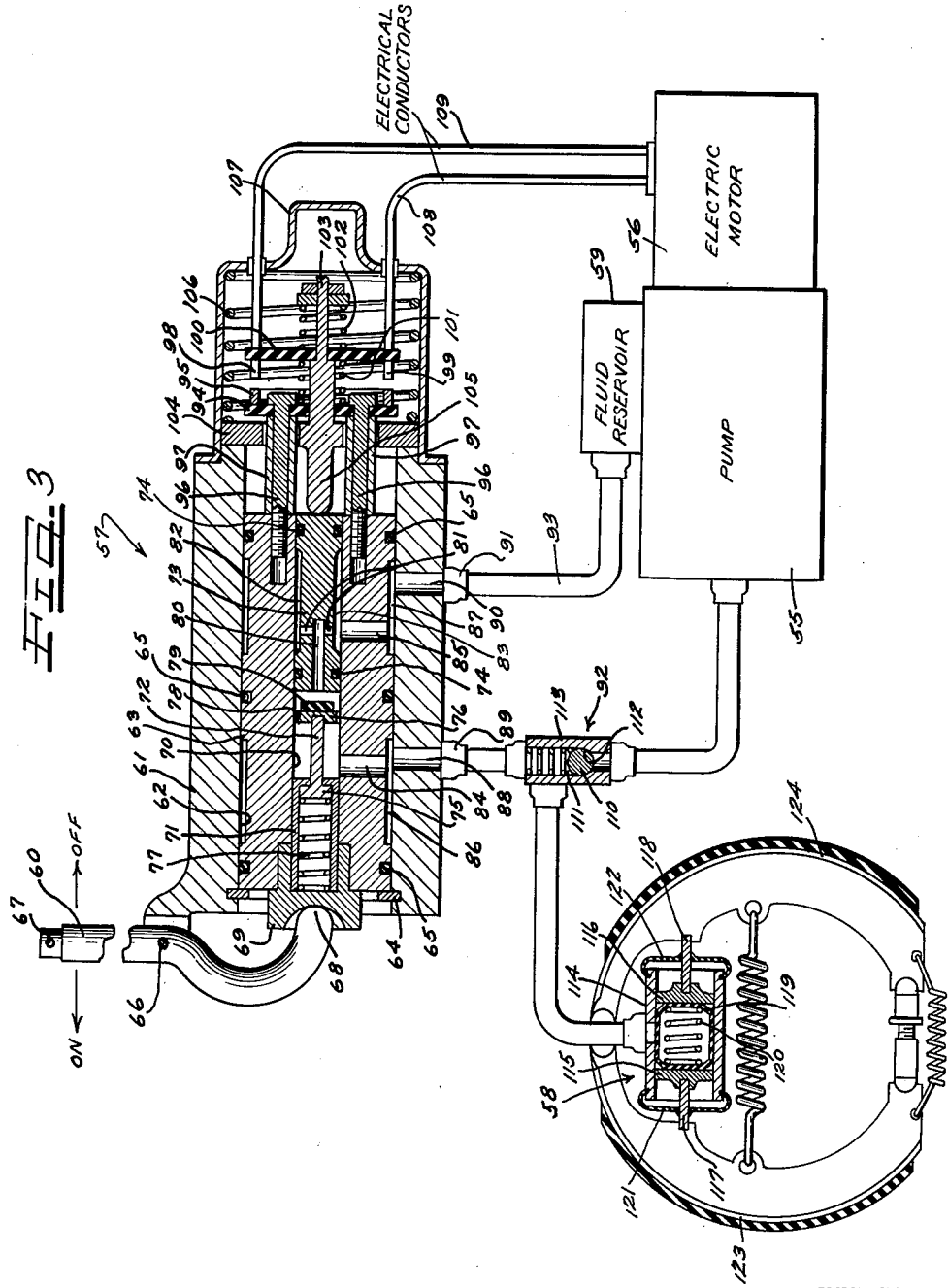

3,080,718
Patented Mar. 12, 1963

3,080,718
HYDRAULIC BRAKE SYSTEM
Harry E. Clary, Chesterland, Ohio, assignor to Thompson Ramo Wooldridge Inc., Cleveland, Ohio, a corporation of Ohio
Filed Aug. 1, 1961, Ser. No. 128,419
5 Claims. (Cl. 60—52)

This invention relates to brake systems and, more particularly, to a remotely controlled hydraulic brake actuating system.

Brake systems constructed in accordance with this invention are used to apply a retarding force to a body in motion such as a moving automobile. Brake systems now in general use for this or analogous purposes are usually constructed with a master cylinder which is actuated to apply a hydraulic braking force to a brake mechanism. This conventional type of system has a disadvantage in that it is not easily controlled from a remote location.

Accordingly, it is an object of this invention to provide a brake system in which the hydraulic pressure is derived from a hydraulic pump rather than a master cylinder.

It is another object of this invention to provide a brake system which is easily controlled from a remote location.

It is still another object of this invention to provide a brake system wherein the hydraulic pressure is derived from a hydraulic pump and is regulated by a by-pass valve.

A still further object of the invention is to provide a brake system having a valve which is so constructed that the braking effort is a function of the position of the control lever for the system, and with the brake applied, the braking force is increased or decreased an amount proportional to the direction and the amount of movement of the control lever.

A still further object of the invention is to provide a valve which is so constructed that the braking effort is a function of the position of the control lever for the valve.

Other objects, features and advantages of the present invention will be apparent from the following detailed description taken in conjunction with the accompanying figures of the drawing, in which:

FIGURE 1 is a diagrammatic illustration of a hydraulic brake system constructed in accordance with the invention;

FIGURE 2 is a detailed view of a portion of the brake system; and

FIGURE 3 is an elevational view of a brake system constructed in accordance with another embodiment of the invention, with some parts broken away to show underlying parts.

As shown on the drawings:

With specific reference to FIGURE 1, the hydraulic brake system includes a hydraulic pump 10, a manually adjustable by-pass valve 11, a fluid reservoir 12, and a conduit 13 coupling these members together. Branching off of the by-pass valve 11 is a conduit 14 which couples the valve 11 to a hydraulic brake mechanism 15.

In operation, the pump 10 operates at a relatively constant rate and delivers fluid to the valve 11, which is connected to the high pressure outlet of the pump 10. The valve 11 directs this fluid to either the fluid reservoir 12 or to the hydraulic brake 15 and, if the braking force is to be withdrawn, the valve 11 directs the fluid to the reservoir 12.

FIGURE 2 illustrates one embodiment of the invention in greater detail. The setting of the valve 11 is controlled by a linkage 16 that is pivotally mounted on a pin 17. This linkage 16 is attached at one end to a wire 18, at its other end to an electrical switch 19, and at an intermediate point to the valve 11. The wire 18 attached to the linkage 16 may be a Bowden wire that has its sheath 20 attached to a stationary frame by a clamp 21. The switch 19 may be a conventional type that has two contact points 22 and 23, the contact 23 being relatively stationary and the contact 22 being spring-loaded in the direction of the contact 23 by a compression spring 24.

The contact 22 is connected to one terminal of a battery 25 that has its other terminal connected to a reference ground potential. The contact 23 is connected to a power input terminal for an electric motor that drives the pump 10. The other power input terminal for the motor is also connected to the reference ground potential. When braking force is desired, the wire 18 is pulled toward the left as seen in FIGURE 2 which causes the linkage 16 to pivot around the pin 17 in a counterclockwise direction. This action causes the contacts 22 and 23 of the switch 19 to close and energize the electric motor driven pump 10. The pump 10 then delivers fluid to the by-pass valve 11 but the pressure will not build up and the braking force will not be applied until the coupling between the pump 10 and the reservoir 12 is closed. This operation is performed by the valve 11.

The valve 11 includes a casing 26 and a valve spool 27 that is slidably mounted in the casing 26. The casing 26 has three ports formed in it, a pump port 28, a reservoir port 29 and a brake port 30. In the unactuated position of the valve shown in FIGURE 2, all three of the ports 28, 29 and 30 are open with the result that the fluid delivered by the pump 10 normally flows through the valve 11 to the reservoir 12. However, when the linkage 16 is rotated still farther in the counterclockwise direction, a land 31 formed on the valve spool 27 partially covers the reservoir port 29 which decreases the flow of the fluid from the pump 10 to the reservoir 12 and increases the pressure within the casing 26. A portion of the fluid then flows through the conduit 14 to a brake cylinder 32 of the hydraulic brake 15 and actuates the brake.

The valve spool 27 is coupled to the linkage 16 by another link 33 that is attached to the linkage 16 by a pin 34 and to the valve spool 27 by another pin 35. A boot 36 made of a flexible material such as rubber or plastic is fastened over the open end of the casing 26 and the link 33 and protects the spool bore from dust and dirt. A stop 37 is fastened to the inner surface of the casing 26 and butts against the end of the spool 27 and prevents it from coming completely out of the spool bore, and a circular seal 38 is positioned in a circular groove 39 formed in the valve spool 27 and prevents the fluid from leaking out of the valve.

The fluid pressure to the brake cylinders is also connected to exert a force on a second land 40 formed on the valve spool 27. This is accomplished by a conduit 41 that is connected between the conduit 14 leading to the brake cylinders and a port 42 formed in the casing 26. The force of the braking fluid against the area presented by the land 40 opposes the force being applied by the operator to move the linkage 16 and gives the operator the feel of the braking force being applied. The diameter of the land 40 can be adjusted to give the desired amount of counter force. A labyrinth groove 43 is formed in the land 40 and prevents excess leakage past this land.

The brake wheel cylinder 32 may be any conventional type. The type illustrated includes two pistons 44 and 45 which couple with two rods 46 and 47, respectively, and an expansible bladder 48. When fluid is forced into the cylinder 32, the bladder 48 expands and forces the two pistons 44 and 45 outwardly which causes the brake shoes to contact the drum and apply a braking force.

Summarizing briefly, the electric motor-driven pump 10 is turned off and a braking force is not applied when the brake system is unenergized. When the system is to be put in operation, the linkage 16 is moved in a counter-clockwise direction around the pin 17 until the contacts 22 and 23 of the switch 19 connect the battery 25 to the electric motor for the pump 10. The pump 10 then circulates fluid through the valve 11 and the reservoir 12. When a braking force is to be applied, the linkage 16 is rotated an additional amount in the counterclockwise direction which causes the land 31 on the valve spool 27 to partially cover the port 29 in the casing 26 which leads to the reservoir 12. It is apparent that as the port 29 is increasingly covered, the pressure within the casing 26 increases and a greater braking force will be applied. When the valve 11 is in the maximum braking position, the port 29 will be entirely covered except for a small by-pass area 49.

The pump 10 should be capable of developing sufficient power within the system to provide the maximum braking force required which is usually enough to slide the wheels on a vehicle having a maximum load. Of course, in normal braking operations, the valve spool 27 will be moved to an intermediate position where the land 31 only partially covers the port 29 and the excess pump capacity is returned to the reservoir 12.

FIGURE 3 illustrates a preferred embodiment of the invention. This embodiment of the invention includes a pump 55 which is driven by an electric motor 56, a valve assembly 57 that directs brake fluid to either a brake mechanism 58 or to a reservoir 59, and a manually operable control lever 60. Depending upon the setting of the valve assembly 57, brake fluid issuing from the pump 55 outlet will flow either to the brake mechanism 58 and cause a braking force to be applied, or through the valve assembly 57 to the reservoir 59.

The valve assembly 57 includes a housing 61 which has a bore 62 formed in it. This bore 62 is preferably circular in cross-section and receives a sleeve assembly 63. The sleeve assembly 63 is slidably mounted within the bore 62 and butts at its left end as seen in FIGURE 3, against an annular stop 64. Three O-ring sealing members 65 are disposed in circular grooves formed in the outer circumference of the sleeve assembly 63 and provide a substantially fluid tight coupling between the sleeve assembly and the bore 62 at these three points.

The control lever 60 is pivotally mounted by a pin 66 on the housing 61. A control cable such as a Bowden wire may be attached to a hole 67 formed in the upper end of the lever 60 and the lower end 68 of the lever butts against a member 69 that is secured to the sleeve assembly 63.

A cylindrical bore 70 is formed substantially axially of the sleeve assembly 63 which receives a hollow cylinder 71, a valve 72, a piston 73, and two O-ring sealing members 74. The two ends 75 and 76 of the valve 72 are enlarged, and the end 75 is disposed within the hollow cylinder 71 and biased toward the right as seen in FIGURE 3, by a compression spring 77. The right hand enlarged end 76 has a plurality of axial flow passages 78 formed in it and a member 79 fastened to its end. This member 79 may be made of a conventional sealing material such as hard rubber.

The disposition of the member 79 is such that when the valve 72 is moved toward the right, relative to the piston 73, the member 79 blocks off the entrance to a passage 80 formed in the piston 73. The axially aligned passage 80 leads to a plurality of radial passages 81 and to a space 82 formed between the piston 73 and the bore 70 by a reduced diameter section of the piston 73 at the portion 83.

The sleeve assembly 63 also has formed therein a pump passage 84 and a reservoir passage 85. The pump passage 84 leads from the bore 70 to a space 86 formed between the sleeve assembly 63 and the housing 61 by a reduced diameter section of the sleeve assembly 63. The reservoir passage 85 leads from the space 82 to another space 87 formed between the sleeve assembly 63 and the housing 61 by another reduced diameter section of the sleeve assembly. A pump port 88 is formed in the housing 61 which places the space 86 in communication with the coupling 89, and a reservoir port 90 is also formed in the housing which places the space 82 in communication with a coupling 91. The coupling 89 connected to the pump port 88 is connected to the pump 55 through a one-way check valve 92, and the coupling 91 connected to the reservoir port 90 is connected to the reservoir 59 by a conduit 93.

Affixed to the right end of the sleeve assembly 63 is a non-conducting plate 94 which supports an electrical connecting ring 95. The plate 94 is supported on the sleeve assembly 63 by two bolts 96 which extend through the plate 94 and two stand-offs 97 and into the end of the sleeve assembly.

Two electrical contacts 98 and 99 are mounted facing the connecting ring 95 on another non-conducting plate 100. This plate 100 is disposed between two springs 101 and 102 and around an extension 103 formed on a pressure plate 104. This pressure plate has a portion 105 which abuts the right end of the piston 73, and it is urged toward the left, as seen in FIGURE 3, by a compression spring 106. A cover 107 is disposed over the end of the housing 61 and slidably receives the pressure plate 104 and the compression spring 106. The electrical contacts 98 and 99 are connected to two electrical conductors 108 and 109 which lead to the electric motor 56 for the pump 55.

In operation, movement of the control lever 60 in a counterclockwise direction, as seen in FIGURE 3, toward the "on" position causes the portion 68 to bear against the member 69 and move the sleeve assembly 63 toward the right, relative to the housing 61. This movement causes the spring 101 to compress as the connecting ring 95 approaches the contacts 98 and 99. The piston 73 is prevented from moving with the sleeve assembly 63, however, by the pressure plate 104 which is loaded by the compression spring 106. After the sleeve assembly 63 moves a short distance relative to the housing and the piston 73, the passage 80 formed in the piston 73 is blocked off by the member 79 attached to the end of the valve 72. This action isolates the pump port 88 from the reservoir port 90.

As the sleeve assembly 63 is moved further toward the right, the compression spring 77 behind the valve 72 is compressed and the electrical connecting ring 95 meets the two electrical contacts 98 and 99. This action completes the electrical circuit through the electric motor 56 and causes the pump 55 and the motor 56 to start up.

Brake fluid then flows out of the pump 55 through the one-way check valve 92 to the brake mechanism 58 and to the valve assembly 57. The brake fluid enters the space formed by the bore 70 between the cylinder 71 and the piston 73 in the sleeve assembly 63. As the pressure builds up in this space, the piston 73 moves toward the right against the force of the spring 106 and moves the electrical contacts 98 and 99 away from the connecting ring 95. The sealing member 79 remains in contact with the end of the piston 73, however, since the spring 77 expands slightly. Accordingly, the electric motor driven pump 55 is turned off when the contacts 98 and 99 leave the connecting ring 95 but the member 79 continues to block off the passage 80 formed in the piston 73. Accordingly, pressure is maintained in the system since the check valve 92 prevents flow from the brake mechanism to the pump 55 and the member 79 prevents flow through the passage 80 to the reservoir 59. The pressure force within the space between the piston 73 and the cylinder 71 acts through the sleeve assembly 63 and the control lever 60 to give the operator a "feel" of the braking force being applied.

It is apparent that a constant braking force will be applied as long as the control lever 60 is maintained in this position since if the braking force tends to reduce in strength, the pressure plate 104 and the plate 106 will move toward the left carrying the electrical contacts 98 and 99 with them toward the ring 95. As soon as electrical connection is made the motor 56 will again start up and increase the braking force to the desired amount.

If additional braking force is desired, the control lever 60 is rotated a greater distance in the counterclockwise direction which moves the sleeve assembly 63 further toward the right. This again brings the connecting ring 95 against the two electrical contacts 98 and 99 and completes the circuit through motor 56. The pressure in the system then increases until the piston 73 moves toward the right and the contacts 98 and 99 move out of contact with the ring 95, breaking the circuit.

If the braking action is to be reduced, the control lever 60 is rotated in the clockwise direction to move the sleeve assembly 63 a short distance to the left. The spring 77 keeps the member 79 in contact with the piston 73 blocking the flow of the braking fluid through the passage 80 to the reservoir, however. When the sleeve assembly 63 is moved toward the left, the space between the cylinder 71 and the piston 73 is increased in volume, which allows fluid from the brake mechanism in the wheel cylinders to bleed back into the valve assembly and bring about the desired decrease in the braking force. If the control lever 60 is rotated all the way to the "off" position, the sleeve assembly 63 moves toward the left and meets the stop member 64, and the valve 72 opens the passage 80 in the piston 73 and vents the brake mechanism in the wheel assembly to the reservoir 59.

In the event the control lever 60 is quickly moved in the counterclockwise direction to the "full on" position, the spring 101 compresses until the connecting ring 95 meets the contacts 98 and 99. The spring 102, which exerts greater force than the spring 101, also compresses slightly and prevents large forces from being applied to the plates 94 and 100.

The pump 55, the motor 56, the reservoir 59, the check valve 92, and the brake mechanism in the wheel assembly are all conventional types. In the embodiment of the invention illustrated, the check valve 92 includes a ball 110 which is urged by a spring 111 against a seat 112 formed in a valve housing 113.

The brake mechanism 58 is also a conventional type that includes a cylinder 114 that encloses two pistons 115 and 116 which couple with two rods 117 and 118, respectively. An extensible bladder 119 is disposed between the two pistons 115 and 116 and a spring 120 urges the bladder 119 and the pistons 115 and 116 against the rods 117 and 118. Two flexible boots 121 and 122 enclose the two ends of the cylinder 114 and prevent dirt from leaking in. The remainder of the brake mechanism including the brake shoes 123 and 124 are conventional and form no part of this invention.

The physical location of the elements making up the system can be adjusted as desired, the only restriction being that the fluid reservoir be above the level of all flow passages in the system. Ordinarily, the reservoir, the pump, and the valve assembly will be incorporated in one unit.

It should be understood that the system can be used to actuate mechanisms other than brake mechanisms.

It will be apparent that modifications and variations may be effected without departing from the scope of the novel concepts of the present invention.

I claim as my invention:

1. A valve assembly comprising a housing, a sleeve assembly slidably mounted within said housing, a piston having a flow passage formed therethrough slidably mounted within said sleeve assembly, a valve slidably mounted within said sleeve assembly adjacent said flow passage, means for adjusting the position of said valve relative to said piston and said flow passage, an inlet port formed in said housing and in said sleeve assembly adjacent said valve, and an outlet port formed in said sleeve assembly and in said housing adjacent the outlet of said flow passage formed in said piston, and means connected to be responsive to the position of said sleeve assembly and said piston for energizing a power consuming load, said last named means including electrical contacts mounted on said sleeve assembly and electrical contacts coupled to said piston.

2. A hydraulic braking system comprising:
   a brake actuator,
   an electric motor driven pump,
   a reservoir,
   a spool valve assembly including a housing and slidable spool valve therein controlling flow from the pump to the reservoir and actuator,
   a passageway connecting one end of the spool valve with pressurized fluid from the pump,
   a pivotally mounted link,
   means connecting said link and the other end of said spool valve to reciprocate the valve in the housing as the link is swung about its pivot,
   a manual actuator for swinging said link about its pivot,
   a first electrical contact on said link,
   a second electrical contact coacting with said first contact and forming a stop for the link,
   a circuit controlled by said contacts to energize and de-energize said motor driven pump,
whereby manual manipulation of said manual actuator will tilt the link to engage the contacts for starting the pump to supply pressurized fluid through the valve assembly to the brake actuator and will then slide the spool valve to control flow between the pump and reservoir while by-passed fluid will oppose the sliding of the valve to produce a feel on the manual actuator.

3. A brake system having an adjustable by-pass valve assembly, said valve assembly being adapted to be coupled to a brake mechanism, a source of pressurized fluid, and a fluid reservoir, and adapted to control the amount of fluid flowing from the source to the brake mechanism and to the reservoir, and said valve assembly comprising:
   a housing,
   a sleeve assembly slidably mounted within said housing,
   a piston having a flow passage formed therethrough slidably mounted within said sleeve assembly,
   a valve slidably mounted within said sleeve assembly adjacent said flow passage,
   means for adjusting the position of said valve relative to said piston and said flow passage,
   an inlet port formed in said housing and in said sleeve assembly adjacent said valve,
   and an outlet port formed in said sleeve assembly and in said housing adjacent the outlet of said flow passage formed in said piston,
   and means connected to be responsive to the position of said sleeve assembly and said piston for energizing a power consuming load,
   said last named means including electrical contacts mounted on said sleeve assembly and electrical contacts coupled to said piston.

4. A valve assembly comprising:
   a housing,
   a sleeve assembly slidably mounted within said housing,
   a piston having a flow passage formed therethrough slidably mounted within said sleeve assembly,
   a valve slidably mounted within said sleeve assembly axially spaced from said flow passage,
   means for adjusting the position of said valve relative to said piston and said flow passage,
   an inlet port formed in said housing and in said sleeve assembly adjacent said valve,
   and an outlet port formed in said sleeve assembly and in said housing adjacent the outlet of said flow passage formed in said piston,
electrical contacts mounted on said sleeve assembly,
and electrical contacts coupled to said piston whereby a power consuming load is energized when said electrical contacts on the piston and sleeve assembly are in contact with one another.

5. A valve assembly comprising:
a housing,
a sleeve assembly slidably mounted within said housing,
a piston having flow passage formed therethrough slidably mounted within said sleeve assembly,
a valve slidably mounted within said sleeve assembly axially spaced from said flow passage,
means for adjusting the position of said valve relative to said piston and said flow passage,
an inlet port formed in said housing and in said sleeve assembly adjacent said valve,
and an outlet port formed in said sleeve assembly and in said housing adjacent the outlet of said flow passage formed in said piston,
a pair of spaced electrical contacts connected to said housing,
first means to close said piston flow passage with said valve to bring said spaced electrical contacts into contact with one another and energize a power consuming load,
and second means connected to said piston to deenergize said power consuming load while maintaining the piston flow passage closed with said valve.

References Cited in the file of this patent

UNITED STATES PATENTS

| | | |
|---|---|---|
| 1,165,653 | Dunn | Dec. 28, 1915 |
| 2,004,078 | McDougall | June 4, 1935 |
| 2,323,519 | Dean | July 6, 1943 |
| 2,330,739 | Piron | Sept. 28, 1943 |
| 2,499,072 | McClure | Feb. 28, 1950 |
| 2,609,665 | Rappl | Sept. 9, 1952 |
| 2,844,941 | Ayers | July 29, 1958 |

FOREIGN PATENTS

| | | |
|---|---|---|
| 239,475 | Great Britain | Dec. 11, 1924 |
| 243,588 | Great Britain | Dec. 3, 1925 |
| 98,846 | Sweden | May 7, 1940 |